United States Patent Office 3,201,372
Patented Aug. 17, 1965

3,201,372
BIURET POLYISOCYANATE BASED
POLYURETHANES
Kuno Wagner, Am Kiesberg, Germany, assignor to Farbenfabriken Bayer Aktiengesellschaft, Leverkusen, Germany, a corporation of Germany
No Drawing. Filed Dec. 5, 1963, Ser. No. 328,167
7 Claims. (Cl. 260—77.5)

This application relates to a method for the preparation of polyurethanes and is a continuation-in-part of my co-pending application Serial No. 806,444, filed April 15, 1959, now U.S. Patent 3,124,605.

Heretofore, in the preparation of polyurethane products such as foams, elastomers, and coatings, for example, several problems have been consistently encountered, not the least of which is the tendency of these products to yellow on exposure to natural and artificial light. In coatings, for example, the problems with light stability compounded with the difficulty of producing polyurethanes which exhibit good weather resistance, elasticity, heat and chemical resistance, abrasion resistance, and so on serve to illustrate the magnitude of the difficulties involved in preparing wholly suitable polyurethane products with good and permanent properties.

In addition, the conventional monomeric polyisocyanates used in preparing these polyurethanes are toxic. The maximum allowable concentration of toluylene diisocyanate, for example, is 0.1 p.p.m. toluylene diisocyanate vapor in the air for extended exposure. This substance is irritating in either its vapor or liquid form and on contact with the skin or eyes, it causes an irritation and will produce burns if not removed immediately. Consequently, elaborate precautions are required to insure the safety of those working with these materials. Expensive ventilating systems are required, or at the very least, the personnel must make use of respirators or gas masks. In addition, these safety precautions may also be necessary with prepolymers prepared from toluylene diisocyanate if they contain several percent or more of free uncombined toluylene diisocyanate.

Further, the conventional polyisocyanates used in the preparation of the polyurethanes are expensive and thus present an additional disadvantage.

It is therefore an object of this invention to provide polyurethanes which are devoid of the foregoing disadvantages.

A further object is to provide a method of making the polyurethanes which is easy, economical, and safe.

A still further object is the production of non-yellowing light fast polyurethanes.

Yet another object is to provide improved and light fast compositions which are based on organic polyisocyanates containing at least one —NCO group bonded to a nonaromatic carbon atom.

It is a further object to provide a method for preparing polyurethanes which exhibit greatly improved weatherability, heat and chemical resistance.

As pointed out in application Serial No. 806,444, biuret polyisocyanates may be used to react with organic compounds having hydrogen atoms reactive with —NCO groups, such as polyesters and polyalkylene ether glycols, to form cellular polyurethanes or homogenous non-porous polyurethanes. Therefore, the foregoing objects and others which will become apparent from the following description are accomplished in accordance with this invention, generally speaking, by providing polyurethane compositions prepared by reacting an organic compound containing active hydrogen containing groups as determined by the Zerewitinoff method, and a biuret polyisocyanate. Such polyisocyanate can be prepared by reacting water in a neutral solution with a monomeric organic diisocyanate in the ratio of 1 mol water to 3 moles diisocyanate or by reacting a monomeric organic diisocyanate with a urea diisocyanate of the formula

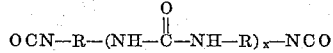

in which R is an aliphatic, cycloaromatic, araliphatic or an aromatic radical which may or may not be substituted with halogen, such as chlorine, an $NO_2$ group, an alkyl radical, an alkoxy radical or the like, and X is from 1 to 5, wherein the alkyl radical on R may be a lower alkyl radical, such as —$CH_3$, —$C_2H_5$, —$C_4H_9$, or the like, and the alkoxy radical on R may be a lower alkoxy radical such as —$OCH_3$, —$OC_2H_5$, —$OC_3H_7$ or the like, said biuret polyisocyanate having the general structure.

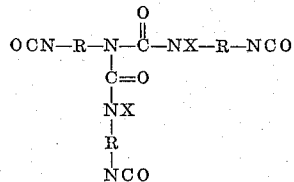

in which R is an aliphatic, cycloaromatic, araliphatic, including aralkyl, or an aromatic radical, which may or may not be substituted with halogen, such as chlorine, $NO_2$, an alkyl radical, an alkoxy radical or the like, and which should not contain any hydrogen atoms which are reactive with an —NCO group, X is either hydrogen or the grouping (—CO—NX—R—NCO) in which the X has the same meaning.

The organic biuret polyisocyanates of this invention have only one —NCO group on each R and the total number of —NCO groups in the molecule, or the average total number of —NCO groups per molecule in case of a mixture of reaction products, does not exceed six.

The polyurethane products prepared by reacting these biuret polyisocyanates with an active hydrogen containing compound exhibit remarkable properities; they are non-yellowing due to their excellent light stability and they possess a very high degree of chemical and heat resistance. The weatherability of these polyurethane products is likewise good, and porous and non-porous polyurethane products which cure to a tack-free state in a short time are easily prepared. Polyurethane coatings have been formulated which exhibit excellent abrasion resistance, outstanding flexibility and hardness, high gloss, and no chalking. This last property is especially important in applications wherein the polyurethane coating is exposed to severe weather, since improved polyurethane coatings do not lose their high gloss due to the erosion of the resin binder of the pigment in the coating so that only the dull pigment remains behind thus producing the phenomenon referred to as chalking.

The problem of toxity is obviated since these biuret polyisocyanates have a high vapor pressure. The use of the biuret polyisocyanates is highly economical too since they are easily fabricated according to the method of application Serial No. 806,444 from any suitable organic diisocyanate such as hexamethylene diisocyanate, for example, which is a very inexpensive and readily available material.

Although the biuret polyisocyanates of this invention may be reacted with polyhydroxyl compounds to produce elastomeric polyurethanes, their main import in the manufacture of elastomers is their ability to modify an already prepared elastomer in a type of vulcanization step, especially in the case of millable gums. In that instance, an elastomeric product, preferably made from hexamethylene diisocyanate and a polyester and having terminal hydroxyl groups, is rolled with the biuret triisocyanate of hexamethylene diisocyanate under a vulcanization press at 100 atmospheres for about 8 hours at 120° C. An elastomer possessing superior properties and which shows no yellowing in either artificial or natural light is obtained.

The polyisocyanates of the invention are useful too for the preparation of cellular polyurethanes by reaction with an active hydrogen containing compound in the presence of a blowing agent. Suitable processes for the preparation of cellular polyurethane plastics are disclosed in U.S. Reissue Patent 24,514 together with a suitable apparatus for mixing the components. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with a polyol to prepare a prepolymer having free —NCO groups which is then reacted in a second step with water to prepare a foam. However, instead of water, low boiling hydrocarbons such as pentane, hexane, heptane, pentene, heptene and the like, halogenated hydrocarbons such as dichlorodifluoroethane, dichlorodifluoromethane, trichlorofluoromethane, vinylidene chloride, methylene chloride, and the like or mixtures thereof, azo compounds such as azohexahydrobenzodinitrile and the like may be used as blowing agents.

Alternately, the components may be reacted in a single step, if desired, with the use of a suitable catalyst, such as stannous chloride, a stannous salt of a carboxylic acid having from 1 to 18 carbon atoms, a trialkyl tin oxide, a dialkyl tin chloride, a dialkyl tin oxide or a dialkyl tin salt of a carboxylic acid having from 1 to 18 carbon atoms. These catalysts may be used alone or in combination with any other suitable catalytic compound, preferably a tertiary amine, such as triethylene diamine, N,N,N',N'-tetramethyl butylene diamine, a 1-alkyl-4-(dialkyl amino alkylene) piperazine in which the alkyl radicals have from 1 to 4 carbon atoms and the alkylene radical has from 2 to 4 carbon atoms, N-ethyl morpholine, or any of those which are disclosed in U.S. Patents 2,948,928, 2,941,967, 2,948,691.

It is often advantageous, and indeed preferable in those instances where the herein described catalysts are employed, to include other additives in the reaction mixture, such as stabilizers, emulsifiers, coloring agents and fillers and the like, for example.

It is particularly advantageous to employ an emulsifier such as, for example, sulphonated castor oil and/or a foam stabilizer such as a silicone oil, for example, a polydimethyl siloxane or an alkyl silane polyoxyalkylene block copolymer. The latter type of silcone oil is disclosed in U.S. Patent 2,834,748. Where polyhydric polyalkylene ethers are included in the reaction mixture to prepare a cellular polyurethane plastic, it is preferred to employ a silcone oil of the above patent within the scope of the formula $$R'Si \diagdown_{\diagdown O(R_2SiO)_r(C_nH_{2n}O)_zR''}^{\diagup O(R_2SiO)_p(C_nH_{2n}O)_zR''} O(R_2SiO)_q(C_nH_{2n}O)_zR''$$

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34.

In a modification of the above formula, R' and R'', in addition to being an alkyl radical having from 1 to 4 carbon atoms, may be hydrogen atoms, or hydroxyl-containing alkyl radicals having from 1 to 4 carbon atoms. A preferred compound, however, has the formula

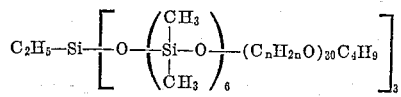

wherein $(C_nH_{2n}O)$ is a mixed polyoxyethylene and oxypropylene block copolymer containing about 17 oxyethylene and about 13 oxypropylene units. Other suitable stabilizers are disclosed in Canadian Patents 668,537, 668,478 and 670,091.

Biuret polyisocyanates may also be used for the production of polyurethane coating compositions. In this case, the organic compound containing active hydrogen containing groups is reacted with the polyisocyanates of the invention in an inert organic solvent therefor, such as, for example, ethyl acetate, methyl formamide, the diethyl ether of diethylene glycol, benzene, xylene, benzine and the like.

A particularly preferred coating composition is based on a solution of a branched polyester, for example, one obtained by reacting a trihydric alcohol, a dihydric alcohol and dicarboxylic acid together in a first step to prepare a polyester having an hydroxyl number of from about 50 to about 150; then combining the resulting polyester with an organic solvent such as, for example, the methyl ester of ethylene glycol acetate, preferably at approximately a 50 percent solution, then reacting the resulting solution of the polyester with a solution of the biuret polyisocyanate. Any suitable trihydric alcohol may be used in the preparation of the polyester such as, for example, glycerine, trimethylol propane, 1,2,6-hexane triol and the like and any suitable dihydric alcohol may be used such as, for example, 1,4-butylene glycol, 1,3-butylene glycol, ethylene glycol or the like. Any suitable dicarboxylic acid may be used such as, for example, adipic acid, sebacic acid or the like. It is to be understood that this is a preferred formulation and that coating compositions with the other active hydrogen containing compounds are also contemplated by the invention.

The biuret polyisocyanates are therefore valuable as starting materials for the production of polyurethane plastics possessing outstanding properties in addition to being important for their ability to modify a previously prepared polyurethane product. They are, as already stated, particularly suitable for the preparation of polyurethane compositions which are light-fast. A further reason for their use in coating compositions, however, is their excellent solubility in organic solvents including those which may be used in their preparation. Furthermore, they are very compatible with the organic compounds containing active hydrogen containing groups which are normally reacted with polyisocyanates including, for example, polyesters, polyethers, polythioethers, polyacetals and the like. The invention then is most useful for the preparation of polyurethane plastics by the reaction of these biuret polyisocyanates with an organic compound containing active hydrogen containing groups as determined by the Zerewitinoff method.

Any suitable organic compound containing at least two active hydrogen containing groups as determined by the Zerewitinoff method may be used. Generally speaking, any compound having an active hydrogen atom as defined above which will react with an —NCO group may be used. Hydroxyl groups react with —NCO groups to yield urethane groups whereas carboxylic acids yield amide groups and amines yield ureas. The alcoholic group is strongly preferred because it is readily available and yields a stronger urethane linkage than a phenolic type hydroxyl group. Moreover, to prepare polyurethane plastics, it is preferred to have an organic compound of the type specified above which contains a plurality of active hydrogen containing groups and preferably at least some alcoholic hydroxyl groups. It is to be understood that when the above terminology is used, active hydrogen containing compounds are contemplated which may contain any of the following types of active hydrogen containing groups, among others, —OH, —NH₂, —NH, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course compounds which contain two or more different groups within the above-identified classes may also be used in accordance with the process of the present invention such as, for example, amino alcohols which contain two amino groups and one hydroxyl group and the like. Also, compounds may be used which contain one —SH group and one —OH group or two —OH groups and one —SH group as well as those which contain an amino group and an —SH group and the like.

The molecular weight of the organic compound containing at least two active hydrogen containing groups may vary over a wide range. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation may vary so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, brassylic acid, sebacic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

Any suitable polyhydric polyalkylene ether may be used such as, for example, the condensation product of an alkylene oxide beginning with any suitable initiator. The initiator may be difunctional compound including water so that the resulting polyether is essentially a chain of repeating alkylene oxy groups as in polyethylene ether glycol, polypropylene polybutylene ether glycol and the like; or the initiator may be any suitable active hydrogen containing compound which may be a monomer or even a compound having a relatively high molecular weight including other active hydrogen containing compounds as disclosed above. It is preferred that the initiator have from 2 to 8 active sites to which the alkylene oxides may add including for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines preferably having 2 to 8 replaceable hydrogen atoms bonded to nitrogen atoms. Phosphorous acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Patents 1,922,459, 3,009,939 and 3,061,625 or by the process disclosed by Wurtz in 1859 and in Encyclopedia of Chemical Technology, volume 7, pages 257 to 262, published by Interscience Publishers, Inc. (1951).

Specific examples of initiators are water, ethylene glycol, propylene glycol, glycerine, trimethylol propane, pentaerythritol, arbitol, sorbitol, maltose, sucrose, ammonia, diethanolamine, triethanolamine, dipropanolamine, tripropanolamine, diethanolpropanolamine, tributanolamine, 2,4-tolylene diamine, 4,4'-diphenylmethane diamine, p,p',p''-triphenylmethane triamine, ethylene diamine, propylene diamine, propylene triamine, N,N,N',N'-tetrakis-(2-hydroxypropyl) ethylene diamine, diethylene triamine and the like. The phosphorous containing polyols are more fully described below.

Any suitable polyhydric polythioether may be used such as, for example, the condensation product of thiodigylcol or the reaction product of a polyhydric alcohol such as is disclosed above for the preparation of the hydroxyl polyesters with any other suitable thioetherglycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like; including 1,20-eicosane diol and the like; alkene diols such as, for example, 1-butene-1,4-diol, 1,3-butadiene-1,4-diol, 2-pentene-1,5-diol, 2-hexene-1,6-diol,2-heptene-1,7-diol and the like; alkyne diols such as, for example, 2-butyne-1,4-diol, 1,5-hexadiyne-1,6-diol and the like; alkane triols such as, for example, 1,3,6-hexane triol, 1,3,7-heptane triol, 1,4,8-octane triol, 1,6,12-dodecane triol and the like; alkene triols such as 1-hexene-1,3,6-triol, and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like;

alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine can be used including for example aromatic polyamines such as, for example, p-amino aniline, 1,5-diamino napththalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino-5-aminomethyl pyrimidine, 2,5-diamino-1,3,4-thiadiazol and the like.

Phosphorous containing compounds are often advantageously used because of the flame retarding effect which they impart to the resulting plastics. These compounds often contain 1 or 2 phosphorous atoms as a nucleus and then have alkylene oxide side chains bonded to the phosphorous nucleus through either phosphate or phosphite type linkages. The phosphate compounds are advantageously prepared by condensing a mixture of phosphorous pentoxide and water with an alkylene oxide as more particularly set forth above. It is advtangeous to use mixtures of phosphorous pentoxide and water which correspond to about 80 percent phosphorous pentoxide and about 20 percent water. But any amount within the range of about 65 percent to 90 percent phosphorous pentoxide and the balance water may be used and the whole range is contemplated. The phosphites are advantageously prepared in accordance with the method of U.S. Patent 3,009,929 where triphenyl phosphite, for example, is reacted with a polypropylene ether glycol to prepare a product having a molecular weight of about 500. Other processes are disclosed in the patent. It is also possible to use polyethers based on phosphorous which contain nitrogen atoms in addition to the phosphorous atoms. These compounds may be represented by the general formula

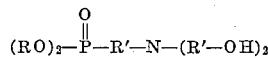

wherein R is lower alkyl or phenyl, for example, methyl, ethyl, propyl, butyl and the like and R' is alkylene, preferably having from 1 to 4 carbon atoms such as, methylene, ethylene, 1,2-propene, 1,4-butylene and the like. A preferred compound is dioxyethylene-N,N-bis-(2-hydroxyethyl) aminomethyl phosphonate.

Any of the compounds of any of the classes set forth above may be substituted with halogen such as for example, chloro, bromo, iodo and the like; nitro; alkoxy, such as, for example, methoxy, ethoxy, propoxy, butoxy and the like; carboalkoxy such as, for example, carbomethoxy, carbethoxy and the like; dialkyl amino such as, for example, dimethyl amino, dipropyl amino, methylethyl amino and the like; mercapto, carbonyl, thiocarbonyl, phosphoryl, phosphato and the like.

As has already been stated, the biuret polyisocyanates can be fabricated by reacting a monomeric organic diisocyanate with water in the ratio of 1 mol water to 3 mols diisocyanate or by reacting a monomeric organic diisocyanate with a urea diisocyanate. Any suitable diisocyanate may be used, such as those listed in application Serial No. 806,444, however, biuret polyisocyanates of hexamethylene diisocyanate are the preferred compounds, and such preferred biuret polyisocyanates may be represented by the following general formula

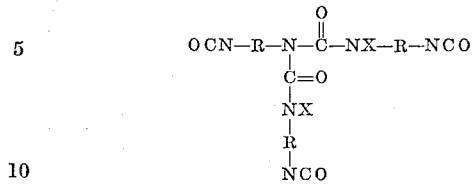

in which R is an aliphatic, cycloaliphatic, araliphatic or aromatic radical, at least one radical represented by R in the formula being an aliphatic, cycloaliphatic, or araliphatic radical. If R is an araliphatic radical, at least one such radical must contain an —NCO group bonded to a nonaromatic carbon atom. The radical represented by R in the foregoing formula may be substituted with halogen such as chlorine, NO₂, an alkyl radical such as methyl, ethyl, butyl, propyl and the like or an alkoxy radical such as methoxy, ethoxy, propoxy and the like or any other suitable inert radical. The only limitation on the radical represented by R in the foregoing formula is that it should not contain any hydrogen atoms which are reactive with an —NCO group. The X in the formula may be either hydrogen or the grouping —CO—NX—R—NCO wherein X is preferably hydrogen. Examples of biuret polyisocyanates which may be used in accordance with the present invention include N,N',N" - tris-(isocyanatohexyl)-biuret, N,N',N"-tris-(isocyanatobutyl)-biuret, N,N',N"-tris-(isocyanatobutyl diisocyanatophenyl)-biuret, N,N',N"-tris-(4-isocyanatocyclohexyl)-biuret, N,N',N" - tris-(4-isocyanatocycloheptyl)-biuret, N,N',N"-tris-(isocyanatobenzyl)-biuret, N,N',N"-tris(beta-isocyanatoethyl benzene)-biuret, N-4-isocyanatophenyl-N',N"-di-(isocyanatobutyl)-biuret as well as higher biuret polyisocyanates which may be represented by formulas

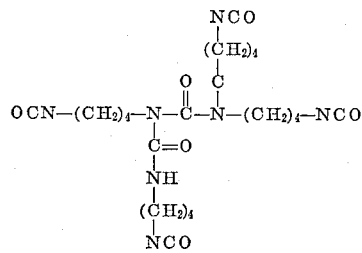

and

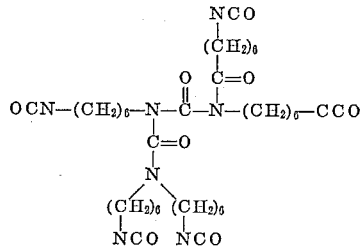

The polyurethane plastics of the invention are useful where polyurethanes have been used heretofore and especially in applications where a light-stable product is required. For example, the foams are useful for cushions and especially rigid foams are useful for both sound and thermal insulation, for example, for walls of buildings. The coatings may be used to coat wood or metals such as steel and the like. The elastomers are useful, for example, for the production of tires or for molded items such as gear wheels or the like.

The invention is further illustrated by the following examples in which parts are by weight unless otherwise specified.

Example A

About 100 parts of a polyester prepared from about 3 mols of phthalic acid, about 3 to 5 mols of trimethylol propane and about 0.05 mol of maleic acid anhydride (hydroxyl content about 10.1 percent) are made into a paste with about 100 parts of a mixture of equal parts of toluene, ethyl acetate, butyl acetate and glycol monomethyl ether acetate and with about 106.5 g. parts of titanium dioxide (Rutil). The paste has added thereto further about 179 parts of the solvent mixture and about 2.1 parts of polyvinylmethyl ether. Then about a 75 percent ethyl acetate solution of the biuret triisocyanate from hexamethylene diisocyanate is added. The lacquer solution is put onto a support while the solvent evaporates. The hydroxyl groups of the polyester react in an equivalency with the isocyanate groups of the biuret triisocyanate. The lacquer shows high resistance against light and weather. The lacquer is completely dried within about 12 hours and exhibits no yellowing in artificial or natural light.

Albert Konig hardness (DIN 53 157) ____seconds__ 180
Erichsen-Cupping (DIN 53 156) _____mm__ 5.8

Example B

About 188 parts of a polyester prepared from adipic acid and glycol (OH number about 58, acid number about 1.1) are mixed with about 12 parts of bis-hydroxyethyl hydroquinone and dehydrated for about half an hour at about 130° C./40 mm. Hg. Then about 27 parts of hexamethylene diisocyanate are added at about 125° C. The mixture is kept while stirring for about 10 minutes at about 125° C. to about 130° C. and then cast onto plates. The mass is after-heated for about 24 hours at about 100° C. A storage-stable gum with terminal hydroxyl groups is obtained which can be made into smooth sheets on a rubber roller. At a temperature of about 120° C. about 10 parts of the biuret triisocyanate from hexamethylene diisocyanate are incorporated into the sheet on the rubber roller from which test plates of an elastomer are obtained under a vulcanization press at about 100 atmospheres and within about 8 hours. The elastomer does not show any yellowing in artificial or natural light.

Example C

About 100 parts of linear polypropylene glycol (OH number about 56), about 45 parts of about a 50 percent solution of the biuret triisocyanate from hexamethylene diisocyanate dissolved in hexamethylene diisocyanate, about 1.2 parts of triethyl diamine, about 2.6 parts of water, about 1 part of the stannous salt of 2-ethyl-caproic acid are simultaneously mixed together and thoroughly stirred. The foaming mixture is cast into molds. The expanded foam solidifies soon and results in an elastic foam which does not show any yellowing in natural or artificial light.

Example D

About a 75 percent solution of a biuret polyisocyanate made from hexamethylene diisocyanate (about 15.2 percent NCO) in ethyl acetate is spread without any additive onto a smooth glass panel. The lacquered glass panel is kept at about 70° C. and about 75 percent moisture for about 14 hours. This results in a non-yellowing, non-shrinking lacquer with high hardness and elasticity.

Example E

About a 75 percent solution of a biuret polyisocyanate made from hexamethylene diisocyanate (about 15.2 percent NCO) in ethyl acetate is spread together with about 0.4 percent of the stannous salt of 2-ethyl caproic acid onto a smooth glass panel. The lacquered glass panel is kept at about 70° C. and about 75 percent moisture for about 2 hours. This results in a non-yellowing, non-shrinking lacquer with high hardness and elasticity.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. In a process for the preparation of a polyurethane which comprises reacting an organic polyisocyanate with an organic compound having at least two reactive hydrogen containing groups as determined by the Zerewitinoff method, the improvement which comprises reacting a biuret polyisocyanate with the reactive hydrogen containing compound to form the polyurethane.

2. The process of claim 1 in which the biuret polyisocyanate is the biuret triisocyanate of hexamethylene diisocyanate.

3. In a process for the preparation of a polyurethane foam by a method which comprises reacting an organic polyisocyanate with an organic compound containing reactive hydrogen containing groups as determined by the Zerewitinoff method in the presence of a foam stabilizer, a catalyst, and a blowing agent, the improvement which comprises reacting a biuret polyisocyanate with the reactive hydrogen containing compound to form the polyurethane.

4. The process of claim 1 in which the biuret polyisocyanate is the biuret triisocyanate of hexamethylene diisocyanate and the polyurethane is in the form of a coating.

5. The product of the process of claim 3.
6. The product of the process of claim 1.
7. The product of the process of claim 2.

References Cited by the Examiner
UNITED STATES PATENTS

| | | | |
|---|---|---|---|
| 2,757,184 | 7/56 | Pelley | 260—77.5 |
| 2,757,185 | 7/56 | Barthel | 260—77.5 |
| 2,987,504 | 6/61 | Wagner | 260—77.5 |
| 3,124,605 | 3/64 | Wagner | 260—77.5 |

LEON J. BERCOVITZ, *Primary Examiner.*
DONALD E. CZAJA, *Examiner.*